UNITED STATES PATENT OFFICE.

CHARLES GLASER, OF BALTIMORE, MARYLAND.

PROCESS OF MAKING CAMPHOR.

No. 864,162.          Specification of Letters Patent.          Patented Aug. 27, 1907.

Application filed January 18, 1906. Serial No. 296,651.     REISSUED

*To all whom it may concern:*

Be it known that I, CHARLES GLASER, a citizen of the United States of America, and a resident of the city of Baltimore, State of Maryland, have invented certain new and useful Improvements in Processes of Making Camphor, of which the following is a specification.

My invention relates to an improvement in making camphor from camphene, borneol, isoborneol and other hydrocarbons and derivatives therefrom yielding camphor upon oxidation.

The following oxidizing agents have been described as yielding camphor when allowed to act on camphene, isoborneol, borneol and allied bodies: chromic acid, permanganates, hydrogen peroxid, nitric acid, gaseous chlorin, and an aqueous solution of chlorin, ozone, oxygen, and air.

I have discovered, that camphene slowly, isoborneol and borneol quite rapidly, may be oxidized to camphor by heating same with a sufficient quantity of an aqueous solution of a bleaching powder or hypochlorite such as $Ca(OCl)_2, CaCl_2$ with or without a catalyzer.

The best way to carry out the process, choosing isoborneol as an example, is as follows: Place 100 parts isoborneol in a suitable vessel and add 100 to 120 parts of bleaching powder or equivalent or other hypochlorite dissolved in 2,400 parts water; apply heat by steam or otherwise. When the temperature has risen to near the boiling point of the liquid, camphor in a pure form will distil from it and collect in the upper cooler portion of the vessel or in a suitable condensing chamber provided for the purpose of collecting it. The conversion is completed in a short time and is quantitative. The activity of the oxidation may be increased by the action of a catalyzing agent such as iron, cobalt and others. The same results may be accomplished with camphene and the other substances, but at different rates of speed.

This process is applicable to the conversion of camphene, isoborneol, borneol, or other camphor-yielding material into camphor, and therefore when I use the word "isoborneol" in the claims I mean it to be understood that all of the other camphor-yielding compounds may be substituted for isoborneol in my process.

What I claim and desire to secure by Letters Patent is:

The process of obtaining camphor which consists in heating a mixture of isoborneol, a hypochlorite, and water and distilling off the camphor formed.

Signed by me at Baltimore, Md. this 16th day of January, 1906.

CHARLES GLASER.

Witnesses:
FLORENCE BARRETT,
WM. E. STRAUS.